United States Patent
Florkey et al.

(10) Patent No.: US 8,126,131 B2
(45) Date of Patent: Feb. 28, 2012

(54) CALL BLOCKING BASED ON THE NETWORK ACCESS TYPE FOR THE CALLED PARTY

(75) Inventors: Cynthia K. Florkey, Chicago, IL (US);
Ruth S. Gayde, Naperville, IL (US);
Victoria M. Halsell, Bolingbrook, IL (US); Karla R. Hunter, Naperville, IL (US); E-Ling Lou, Naperville, IL (US)

(73) Assignee: Alcatel Lucent, Paris (FR)

( * ) Notice: Subject to any disclaimer, the term of this patent is extended or adjusted under 35 U.S.C. 154(b) by 1331 days.

(21) Appl. No.: 11/153,182

(22) Filed: Jun. 15, 2005

(65) Prior Publication Data
US 2007/0003049 A1 Jan. 4, 2007

(51) Int. Cl.
*H04M 3/42* (2006.01)

(52) U.S. Cl. .............. 379/210.02; 370/352; 379/201.01; 379/221.14; 379/258; 455/552.1; 709/201; 709/227

(58) Field of Classification Search .......... 370/351–356, 370/259–271; 379/201.01, 207.02, 210.02, 379/210.03, 211.01, 220.01, 221.02, 221.08, 379/221.14, 221.15, 225, 243; 455/414.1, 455/417; 709/201–207, 243–244, 217–232; 348/14.01–14.16
See application file for complete search history.

(56) References Cited

U.S. PATENT DOCUMENTS
4,661,974 A * 4/1987 Bales et al. .................. 379/198
(Continued)

*Primary Examiner* — Hemant Patel
(74) *Attorney, Agent, or Firm* — Duft Bornsen & Fishman LLP

(57) ABSTRACT

A communication network and method are disclosed that block calls from a calling party based on the network access type of a called party. The communication network of the invention includes a permission system, an access system, and a call control system. Based on a call from a calling party to a called party, the permission system identifies permissions associated with the calling party. The access system identifies a network access type for the called party, such as wireless, circuit-based, etc. The call control element determines if the network access type for the called party is permitted by the calling party based on the permissions associated with the calling party. If the network access type for the called party is not permitted by the calling party, then the call control system releases the call.

20 Claims, 5 Drawing Sheets

U.S. PATENT DOCUMENTS

| | | | |
|---|---|---|---|
| 5,436,957 A * | 7/1995 | McConnell | 379/88.23 |
| 5,680,446 A * | 10/1997 | Fleischer et al. | 379/114.28 |
| 5,745,850 A * | 4/1998 | Aldermeshian et al. | 455/417 |
| 5,754,641 A * | 5/1998 | Voit et al. | 379/354 |
| 6,041,108 A * | 3/2000 | Brewster et al. | 379/196 |
| 6,064,887 A * | 5/2000 | Kallioniemi et al. | 455/445 |
| 6,240,449 B1 * | 5/2001 | Nadeau | 709/223 |
| 6,311,055 B1 * | 10/2001 | Boltz | 455/414.1 |
| 6,327,349 B1 * | 12/2001 | Rollins | 379/114.27 |
| 6,724,874 B2 * | 4/2004 | Fleischer et al. | 379/196 |
| 6,741,835 B2 * | 5/2004 | Pulver | 455/3.05 |
| 6,907,031 B1 * | 6/2005 | Ehlinger et al. | 370/352 |
| 7,054,431 B2 * | 5/2006 | Fleischer et al. | 379/221.08 |
| 7,218,924 B2 * | 5/2007 | McArdle | 455/418 |
| 7,245,932 B2 * | 7/2007 | Florkey et al. | 455/518 |
| 7,298,835 B1 * | 11/2007 | Perry | 379/210.02 |
| 7,447,165 B1 * | 11/2008 | Sylvain | 370/254 |
| 2004/0234062 A1 * | 11/2004 | Jones | 379/210.02 |
| 2005/0122962 A1 * | 6/2005 | Delaney et al. | 370/352 |

* cited by examiner

CALL BLOCKING BASED ON THE NETWORK ACCESS TYPE FOR THE CALLED PARTY

BACKGROUND OF THE INVENTION

1. Field of the Invention

The invention is related to the field of communication networks and, in particular, to call blocking based on the network access type for the called party.

2. Statement of the Problem

Call blocking is a service that allows a subscriber to define what calls he/she receives. For instance, the subscriber may block one or more specific telephone numbers. The subscriber may also block a category of calls, such as anonymous calls. Call blocking may take place in a PBX or key system, in a central office for the subscriber, or in some other system. Current call blocking services are tailored for the recipient of calls (i.e., the called party).

For a variety of reasons, a calling party may want to use call blocking services to block his/her own outgoing calls. The calling party might not want to complete a call to a called party that is accessing the communication network with a particular network access type, such as a wireless access type, a circuit-based access type, etc. As an example, telemarketers are not allowed to call wireless phones. At the same time, telemarketers have no easy way of determining whether a phone number is to a wireless phone or not, especially with the advent of number portability. Therefore, a problem exists that communication networks do not provide call blocking services for calling parties that block calls based on the network access type for the called party.

SUMMARY OF THE SOLUTION

The invention solves the above and other related problems by blocking calls based on the network access type for the called party. The network access type for the called party includes, but is not limited to, wireless access type or circuit-based access type. The network access type may also include a particular service provider of a plurality of service providers. According to the invention, the calling party can advantageously define what network access types are permitted and those not permitted. The calling party will thus avoid connecting calls to called parties having a particular network access type.

In one embodiment of the invention, a communication network of the invention includes a permission system, an access system, and a call control system. The communication network receives a call from a calling party to a called party. The permission system identifies permissions associated with the calling party. The permissions are for particular network access types that are permitted or not permitted by the calling party in terminating a call to the called party. The access system identifies a network access type for the called party, such as wireless, circuit-based, etc. The call control element determines if the network access type for the called party is permitted by the calling party based on the permissions associated with the calling party. If the network access type for the called party is permitted by the calling party, then the call control system attempts to connect the call to the called party. If the network access type for the called party is not permitted by the calling party, then the call control system releases the call.

The invention may include other exemplary embodiments described below.

DESCRIPTION OF THE DRAWINGS

The same reference number represents the same element on all drawings.

DETAILED DESCRIPTION OF THE INVENTION

FIGS. 1-5 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
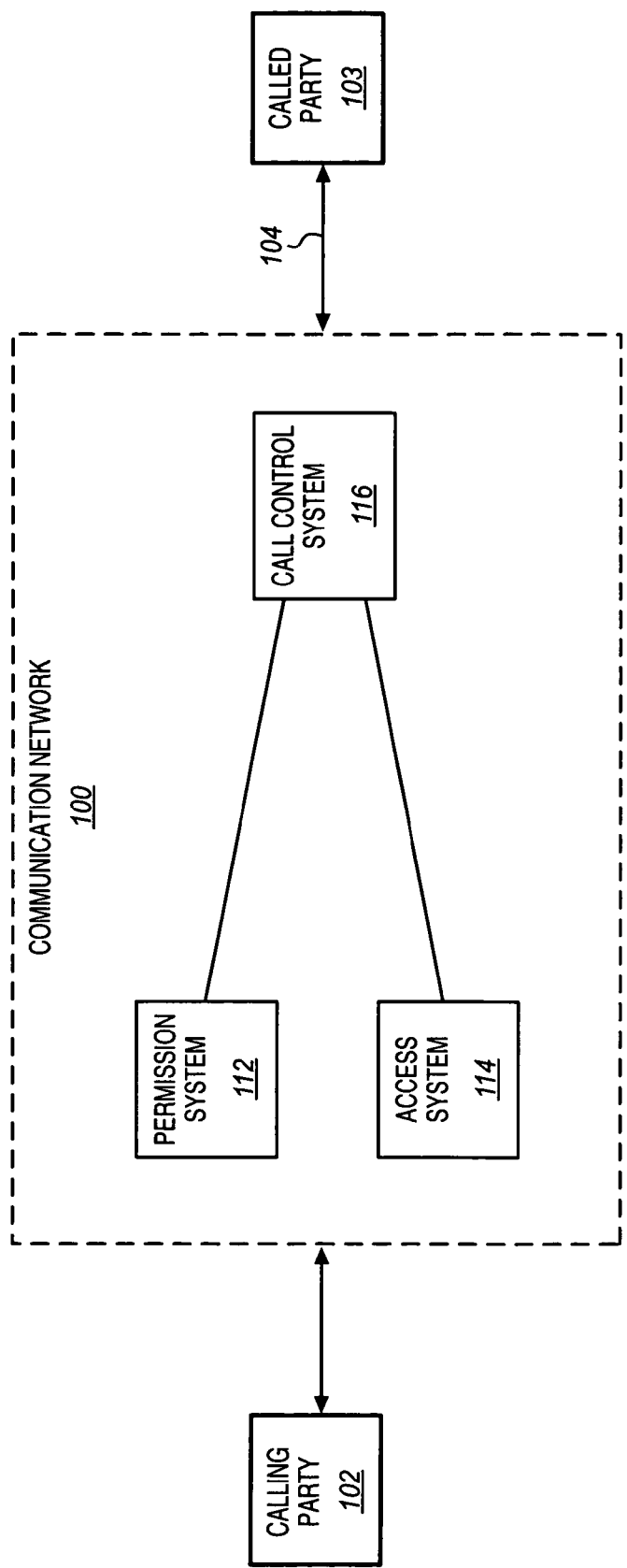
FIG. 1 illustrates a communication network in an exemplary embodiment of the invention.

FIG. 1 illustrates a communication network 100 in an exemplary embodiment of the invention. Communication network 100 may comprise a wireless network, a wireline network, a circuit-based network, a packet-based network, or any other network or combination thereof. Communication network 100 is operable to connect a call between a calling party 102 and a called party 103. Communication network 100 includes a permission system 112, an access system 114, and a call control system 116. Communication network 100 may include other networks, systems, or devices not shown in FIG. 1.

Permission system 112 comprises any system, server, or application that determines or identifies one or more permissions associated with calling party 102 or defined by calling party 102 for calls. Permissions are privileges granted to a calling party with respect to terminating a call to particular called party network access types. As an example, one permission may be that the calling party can only terminate a call to a circuit-based phone (landline phone). Another permission may be that the calling party cannot terminate a call to a mobile wireless phone. Another permission may be that the calling party can only terminate a call to a mobile wireless phone of a particular service provider.

Access system 114 comprises any system, server, or application that determines or identifies a network access type for called party 103. Called party 103 accesses communication network 100 according to a particular network access type. The network access type for called party 103 is illustrated generally as link 104 in FIG. 1. A network access type is any service used by a called party to access a communication network to transmit and receive voice and/or data. Network access types may include, but are not limited to, wireless, circuit-based (landline), etc. As an example, a mobile or wireless subscriber has a wireless access type as defined herein. A regular landline phone in a residence has a circuit-based access type as defined herein. Another network access type may include a packet-based access type, such as Voice over Internet Protocol (VoIP), which may be over a wireless access type, a circuit-based access type, or another access type.

The network access types may also or alternatively include particular service providers. One network access type may be one of a plurality of service providers, while another network access type may be another one of the plurality of service providers. For instance, one wireless subscriber may have a network access type defined as Verizon, while another wireless subscriber may have a network access type defined as Cingular.

Call control system 116 comprises any system, server, or application that provides call control for a call. Call control may comprise setting up, maintaining, or tearing down a call.

Permission system 112, access system 114, and/or call control system 116 may comprise the same or separate applications running on one or more platforms in the communication network 100. For instance, one or more of permission system 112, access system 114, and call control system 116 may run on an originating node (not shown) for communication network 100, such as an originating MSC or an originating switch. One or more of permission system 112, access system 114, and call control system 116 may run on a terminating node (not shown) for communication network 100, such as a terminating MSC or a terminating switch. One or more of permission system 112, access system 114, and call control system 116 may run on an intelligent peripheral (not shown) or intelligent resource in communication network 100.

Figure 2:
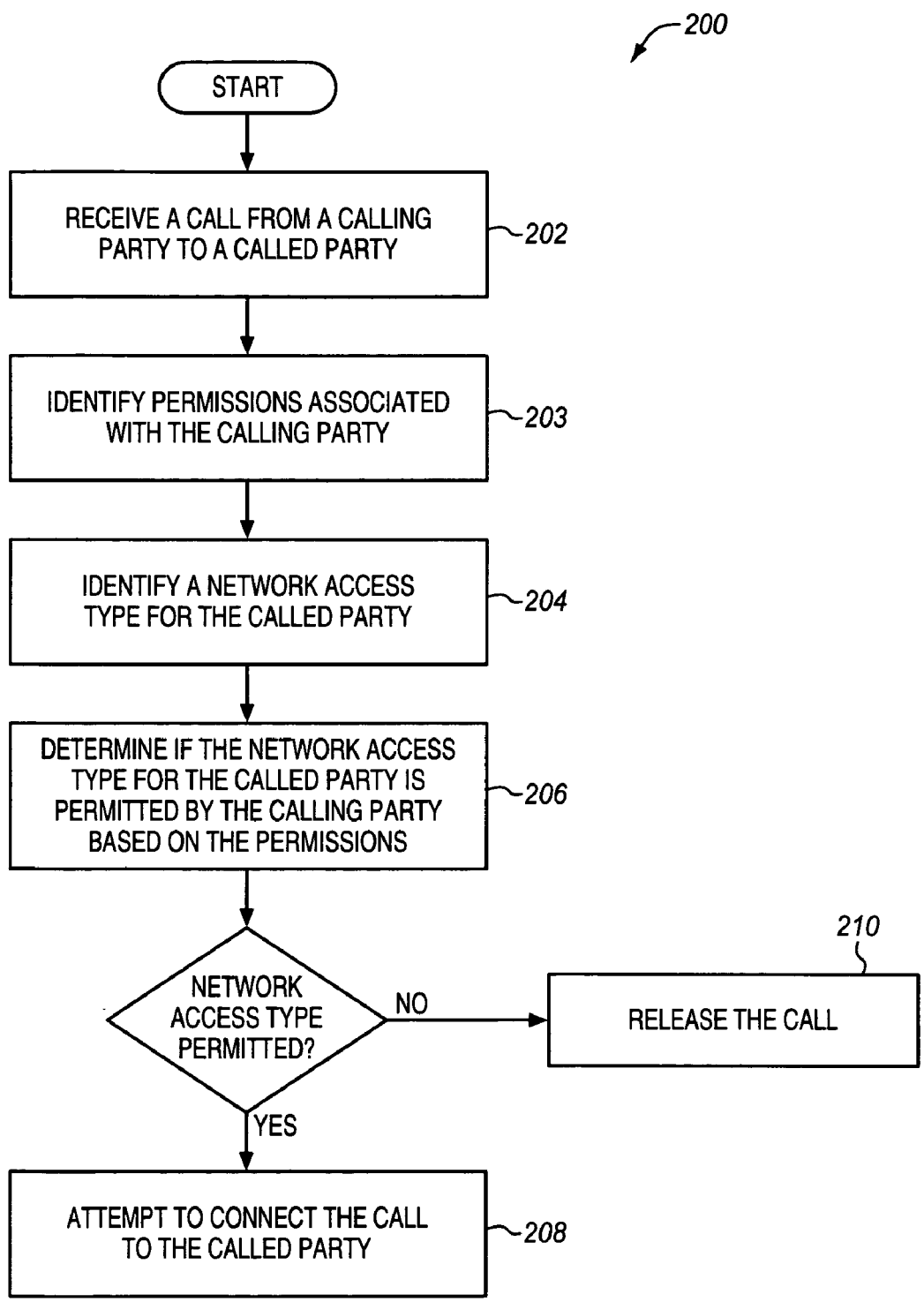
FIG. 2 is a flow chart illustrating a method of operating the communication network of FIG. 1 in an exemplary embodiment of the invention.

FIG. 2 is a flow chart illustrating a method 200 of operating communication network 100 in an exemplary embodiment of the invention. The steps of method 200 will be described with reference to communication network 100 in FIG. 1. The steps of the flow chart in FIG. 2 are not all inclusive and may include other steps not shown.

In step 202 of method 200, communication network 100 receives a call from calling party 102 to called party 103. Responsive to receiving the call, permission system 112 identifies one or more permissions associated with calling party 102 in step 203. The permissions in this embodiment are for particular network access types that are permitted or not permitted by calling party 102 in terminating a call to called party 103. The permissions may be predefined by calling party 102.

In step 204, access system 114 identifies a network access type for called party 103. Access system 114 may identify the network access type for called party 103 based on the equipment or system used to serve called party 103. For instance, if the system used to serve called party 103 is an MSC, then access system 114 is able to identify that the network access type for called party 103 is wireless. If the system used to serve called party 103 is a traditional circuit-based switch, then access system 114 is able to identify that the network access type for called party 103 is circuit-based or landline.

In step 206, call control system 116 determines if the network access type for the called party 103 is permitted by the calling party 102 based on the permissions. If the network access type for the called party 103 is permitted by the calling party 102, then call control system 116 attempts to connect the call to the called party 103 in step 208. If the network access type for the called party 103 is not permitted by the calling party 102, then call control system 116 releases the call in step 210.

Communication network 100 as described in FIGS. 1-2 advantageously provides a mechanism where the calling party 102 is blocked from making calls to certain called parties. For instance, if calling party 102 is a telemarketer, then calling party 102 may block all calls to cell phones. This network-based solution gives the calling party the ability to selectively block his/her own calls.

Figure 3:
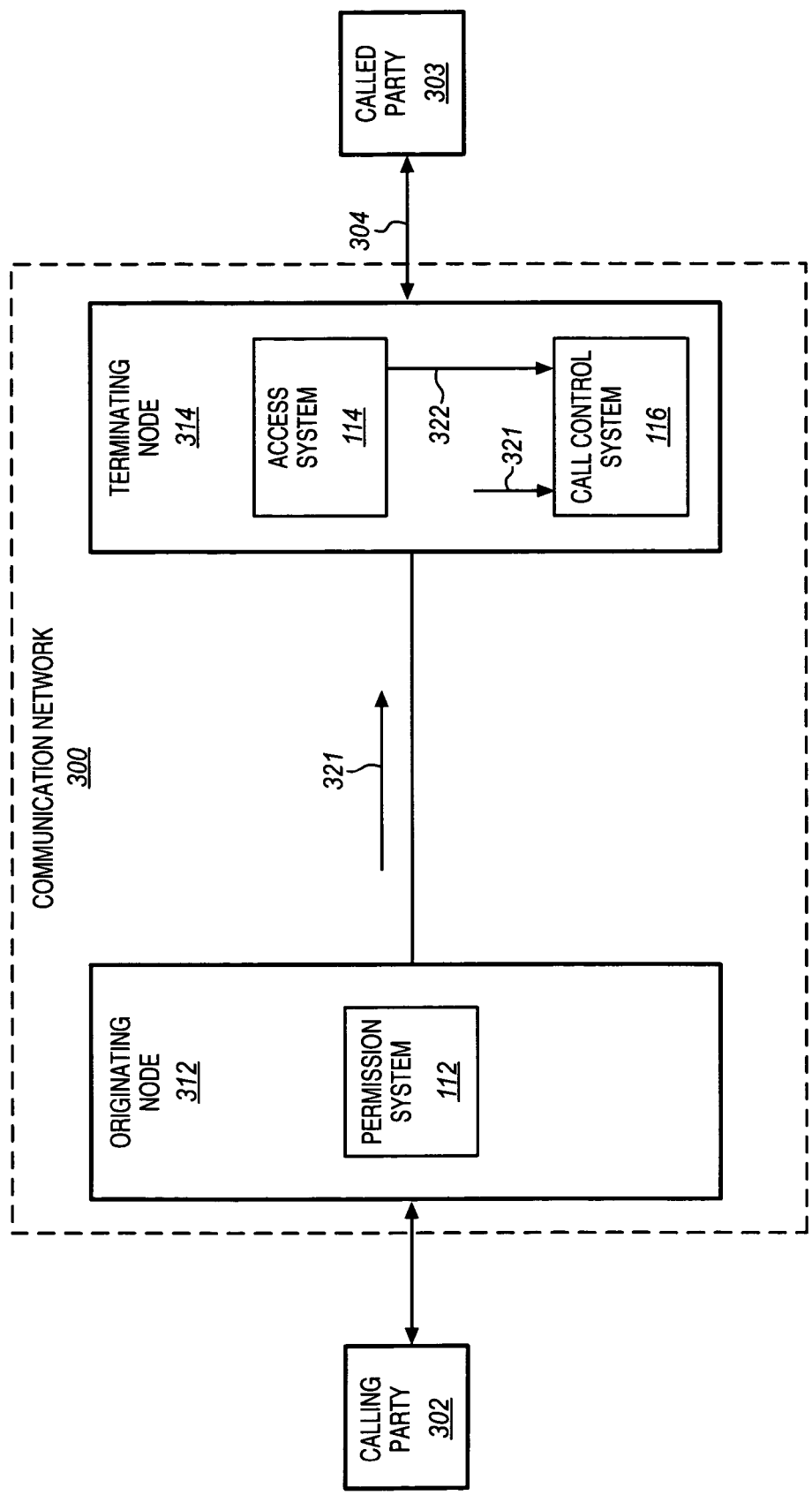
FIG. 3 illustrates another embodiment of a communication network.

FIG. 3 illustrates another embodiment of a communication network 300 in an exemplary embodiment of the invention. Communication network 300 is operable to connect a call between a calling party 302 and a called party 303. Communication network 300 includes an originating node 312 and a terminating node 314. In this embodiment, permission system 112 is embodied in originating node 312. Access system 114 and call control system 116 are embodied in terminating node 314. Communication network 300 may include other networks, systems, or devices not shown in FIG. 3.

Originating node 312 comprises any network node operable to originate a call into communication network 300 from calling party 302. Examples of originating node 312 include an originating MSC or an originating switch. Terminating node 314 comprises any network node operable to terminate a call to called party 303. Examples of terminating node 314 include a terminating MSC or a terminating switch. Originating node 312 and terminating node 314 will generally differ for different combinations of calling and called parties, and it is possible that a single network node comprises both the originating node 312 and terminating node 314.

Called party 303 accesses communication network 300 via a particular network access type. The network access type for called party 303 is illustrated generally as link 304 in FIG. 3. If the network access type for called party 303 is wireless, then called party 303 may communicate with terminating node 314 via wireless resources in a base station (not shown). If the network access type for called party 303 is circuit-based, then called party 303 may communicate with terminating node 314 over a local loop made of copper. If the network access type for called party 303 is packet-based, then called party 303 may communicate with terminating node 314 over any wireless path or wireline loop capable of transporting digital data in the form of packets. Assume for this embodiment that the network access type for called party 303 is wireless.

When in operation, calling party 302 predefines one or more network access types that are permitted, or defines one or more network access types that are not permitted. The predefined network access types permitted by calling party 302 are stored in originating node 312 or in a subscriber database (not shown) accessible by originating node 312. For this embodiment, assume that calling party 302 has predefined that calls cannot be terminated to wireless devices, such as cell phones, wireless computers, PDAs, etc.

Subsequently, calling party 302 places a call to called party 303, and originating node 312 receives the call. Responsive to the call, permission system 112 identifies the permissions associated with calling party 302, if any. The permissions include network access types permitted by the calling party 302. Permission system 112 transmits the permissions (arrow 321) to terminating node 314. Originating node 312 may transmit the permissions in a call setup message, such as an Initial Address Message (IAM) or some other ISDN User Part (ISUP) message. The call setup message may have to be altered to add a field for the permissions. Terminating node 314 receives the permissions associated with calling party 302, and forwards to call control system 116.

Access system 114 identifies the network access type for called party 303, which is wireless in this example. Because terminating node 314 is operable to communicate with called party 303, access system 114 operating on terminating node 314 can easily identify the network access type for called party 303. Access system 114 transmits the network access type (arrow 322) for called party 303 to call control system 116.

Call control system 116 receives the permissions (arrow 321) associated with calling party 302 and receives the network access type (arrow 322) for called party 303. Call control system 116 determines if the network access type for called party 303 is permitted by calling party 302 based on the permissions associated with calling party 302. If the network access type for called party 303 is permitted, then call control system 116 attempts to connect the call to called party 303. If the network access type for the called party 303 is not permitted, then call control system 116 releases the call.

In this embodiment, called party 303 is accessing communication network 300 with a wireless phone, and calling party 302 predefined in network 300 that calls cannot be terminated to wireless devices. Therefore, call control system 116 would release the call. Call control system 116 may also instruct originating node 312 to play an announcement to calling party 302 indicating why the call was released.

Figure 4:
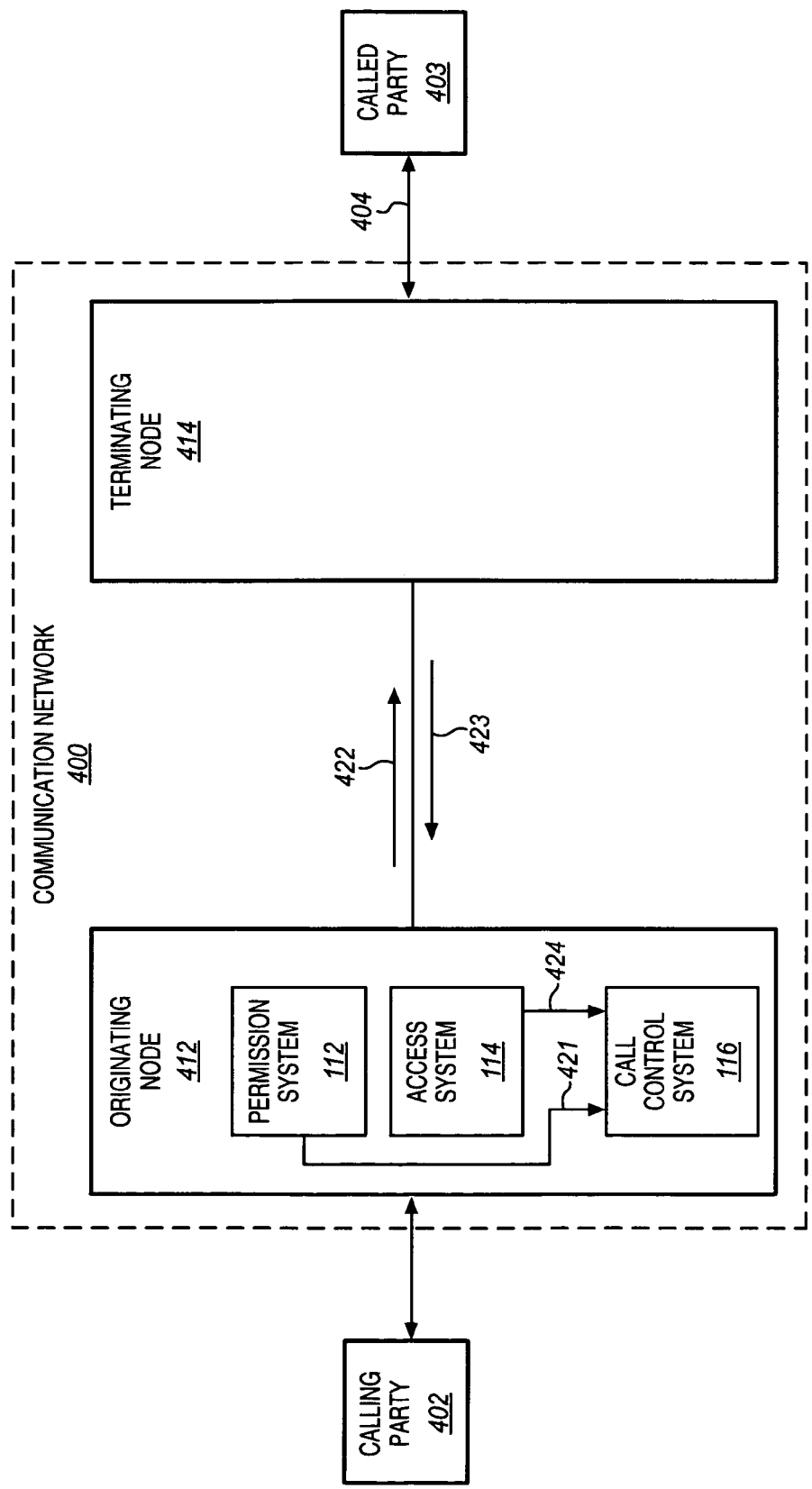
FIG. 4 illustrates another embodiment of a communication network.

FIG. 4 illustrates another embodiment of a communication network 400 in an exemplary embodiment of the invention. Communication network 400 is operable to connect a call between a calling party 402 and a called party 403. Communication network 400 includes an originating node 412 and a terminating node 414. In this embodiment, permission system 112, access system 114, and call control system 116 are all embodied in originating node 412. Communication network 400 may include other networks, systems, or devices not shown in FIG. 4.

Called party 403 accesses communication network 400 via a particular network access type. The network access type for called party 403 is illustrated generally as link 404 in FIG. 4. Assume for this embodiment that the network access type for called party 403 is circuit-based (landline).

When in operation, calling party 402 predefines one or more network access types that are permitted, or defines one or more network access types that are not permitted. The predefined network access types permitted by calling party 402 are stored in originating node 412 or in a subscriber database (not shown) accessible by originating node 412. For this embodiment, assume that calling party 402 has predefined that calls cannot be terminated to wireless devices.

Subsequently, calling party 402 places a call to called party 403, and originating node 412 receives the call. Responsive to the call, permission system 112 identifies the permissions associated with calling party 402. The permissions include network access types permitted by the calling party 402. Originating node 412 may store the permissions, or permission system 112 may access a subscriber database (not shown) that stores the permissions. Permission system 112 transmits the permissions (arrow 421) to call control system 116.

Access system 114 needs to identify the network access type for called party 403. To identify the network access type in this embodiment, access system 114 transmits a query (arrow 422) to terminating node 414 for the network access type for called party 403. Originating node 412 may transmit the query in a call setup message, such as an IAM. The call setup message may have to be altered to add a field for the query. Responsive to the query, terminating node 414 transmits a response (arrow 423) to originating node 412 indicating the network access type for called party 403. Terminating node 414 may transmit the response in a call setup message, such as an address complete (ACM) message. The call setup message may have to be altered to add a field for the response.

Based on the response from terminating node 414, access system 114 is able to identify the network access type for called party 403, which is circuit-based in this embodiment. Access system 114 transmits the network access type (arrow 424) for called party 403 to call control system 116.

Call control system 116 receives the permissions (arrow 421) associated with calling party 402 and receives the network access type (arrow 424) for called party 403. Call control system 116 determines if the network access type for called party 403 is permitted by calling party 402 based on the permissions associated with calling party 402. If the network access type for called party 403 is permitted, then call control system 116 attempts to connect the call to called party 403. If the network access type for the called party 403 is not permitted, then call control system 116 releases the call.

In this embodiment, called party 403 is accessing communication network 400 with a landline phone, and calling party 402 predefined in network 400 that calls can be terminated to landline phones. Therefore, call control system 116 would continue call processing to connect the call to called party 403.

Figure 5:
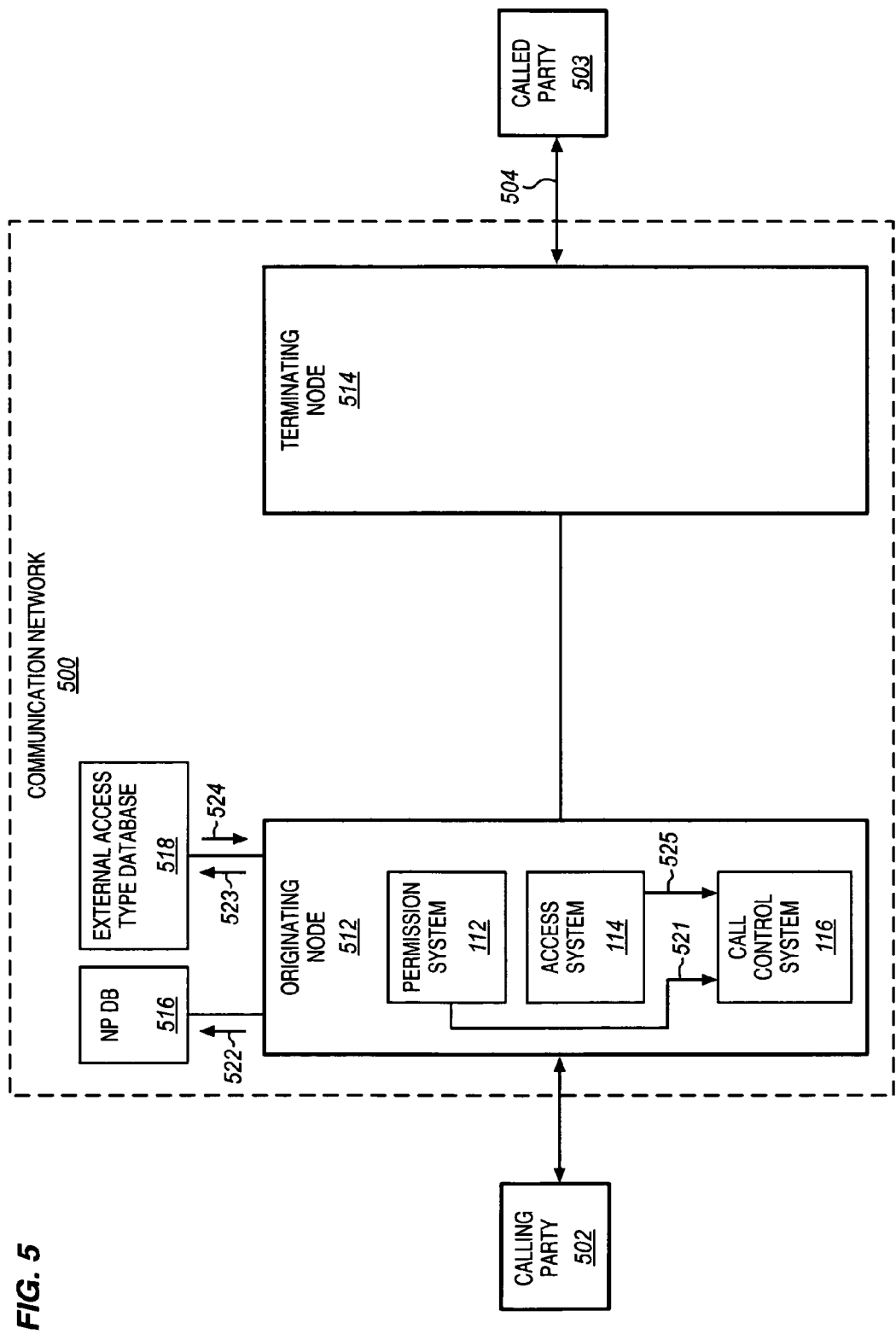
FIG. 5 illustrates another embodiment of a communication network.

FIG. 5 illustrates another embodiment of a communication network 500 in an exemplary embodiment of the invention. Communication network 500 is operable to connect a call between a calling party 502 and a called party 503. Communication network 500 includes an originating node 512, a terminating node 514, a number portability (NP) database 516, and an external access type database 518. Number portability (NP) database 516 comprises any database having information on the porting of telephone numbers. External access type database 518 comprises any database that includes access type information for communication network 500. The access type information may originate from a Local Exchange Routing Guide (LERG) or some other source. Communication network 500 may include other networks, systems, or devices not shown in FIG. 5.

Called party 503 accesses communication network 500 via a particular network access type. The network access type for called party 503 is illustrated generally as link 504 in FIG. 5. Assume for this embodiment that the network access type for called party 503 is wireless.

When in operation, calling party 502 predefines one or more network access types that are permitted, or defines one or more network access types that are not permitted. The predefined network access types permitted by calling party 502 are stored in originating node 512 or in a subscriber database (not shown) accessible by originating node 512. For this embodiment, assume that calling party 502 has predefined that calls cannot be terminated to wireless devices.

Subsequently, calling party 502 places a call to called party 503, and originating node 512 receives the call. Responsive to the call, permission system 112 identifies the permissions associated with calling party 502. The permissions include network access types permitted by the calling party 502. Originating node 512 may store the permissions, or permission system 112 may access a subscriber database (not shown) that stores the permissions. Permission system 112 transmits the permissions (arrow 521) to call control system 116.

Access system 114 needs to identify the network access type for called party 503. Access system 114 first determines if the directory number dialed by calling party 502 has been ported. Access system 114 transmits a query (arrow 522) to number portability database 516 with the directory number dialed by calling party 502. If access system 114 receives an empty response or a response with no Location Routing Number (LRN) from number portability database 516, then the dialed number has not been ported. If access system 114 receives an LRN from number portability database 516, then the dialed number has been ported.

Access system 114 transmits a query (arrow 523) to external access type database 518 for the network access type for called party 503. Access system 114 includes the dialed number or the LRN in the query. Responsive to the query, external access type database 518 returns an indicator (arrow 524) as to the type of terminating node 514. Access system 114 then identifies the network access type of called party 503 based on the indicator from external access type database 518. For instance, if the indicator shows that terminating node 514 is an MSC, then originating node 512 identifies that the network access type of called party 503 is wireless. If the indicator shows that terminating node 514 is a switch, then originating node 512 identifies that the network access type of called party 503 is circuit-based. Access system 114 transmits the network access type (arrow 525) to call control system 116.

Call control system 116 receives the permissions (arrow 521) associated with calling party 502 and receives the network access type (arrow 525) for called party 503. Call control system 116 determines if the network access type for called party 503 is permitted by calling party 502 based on the permissions associated with calling party 502. If the network access type for called party 503 is permitted, then call control system 116 attempts to connect the call to called party 503. If the network access type for the called party 503 is not permitted, then call control system 116 releases the call.

In this embodiment, called party 503 is accessing communication network 500 with a wireless phone, and calling party 502 predefined in network 500 that calls cannot be terminated to wireless phones. Therefore, originating node 512 would release the call. Call control system 116 may also instruct originating node 512 to play an announcement to calling party 502 indicating why the call was released.

We claim:

1. A communication network operable to receive a call from a calling party to a called party, the communication network comprising:
   a permission system operable to identify permissions associated with the calling party that indicate access network types that are permitted by the calling party in terminating calls to called parties;
   an access system operable to identify an access network type for the called party, wherein the access network type indicates a service used by the called party to access the communication network; and
   a call control system operable to determine if the access network type for the called party is permitted by the calling party for the call based on the permissions associated with the calling party, and to attempt to connect the call to the called party if the access network type for the called party is permitted by the calling party.

2. The communication network of claim 1 wherein the call control system is operable to release the call if the access network type for the called party is not permitted by the calling party.

3. The communication network of claim 1 wherein the access network type comprises one of wireless or circuit-based.

4. The communication network of claim 1 wherein the access network type comprises one of a plurality of service providers.

5. The communication network of claim 1 further comprising:
   a subscriber database operable to store the permissions associated with the calling party.

6. The communication network of claim 5 wherein the permission system is operable to query the subscriber database to identify the permissions associated with the calling party.

7. The communication network of claim 1 wherein the access system is operable to query a terminating node in the communication network that serves the called party to identify the access network type for the called party.

8. The communication network of claim 1 further comprising:
   an external access type database operable to store access type information for the called party.

9. The communication network of claim 8 wherein the access system is operable to transmit a query to the external access type database, and to identify the access network type of the called party based on a response from the external access type database.

10. The communication network of claim 8 wherein the access type information originates from a local exchange routing guide (LERG).

11. A method comprising:
    receiving a call from a calling party to a called party;
    identifying permissions associated with the calling party that indicate access network types that are permitted by the calling party in terminating calls to called parties;
    identifying an access network type for the called party, wherein the access network type indicates a service used by the called party to access the communication network;
    determining if the access network type for the called party is permitted by the calling party for the call based on the permissions associated with the calling party; and
    attempting to connect the call to the called party if the access network type for the called party is permitted by the calling party.

12. The method of claim 11 further comprising:
    releasing the call if the access network type for the called party is not permitted by the calling party.

13. The method of claim 11 wherein the access network type comprises one of wireless or circuit-based.

14. The method of claim 11 wherein the access network type comprises one of a plurality of service providers.

15. The method of claim 11 further comprising:
    storing the permissions associated with the calling party in a subscriber database.

16. The method of claim 15 wherein identifying permissions associated with the calling party comprises:
    querying the subscriber database to identify the permissions associated with the calling party.

17. The method of claim 11 wherein identifying an access network type for the called party comprises:
    querying a terminating node in the communication network that serves the called party to identify the access network type for the called party.

18. The method of claim 11 further comprising:
    storing access type information in an external access type database.

19. The method of claim 18 wherein identifying an access network type for the called party comprises:
    transmitting a query to the external access type database; and
    identifying the access network type of the called party based on a response from the external access type database.

20. The method of claim 18 wherein the access type information originates from a local exchange routing guide (LERG).

* * * * *